(12) United States Patent
Yin et al.

(10) Patent No.: US 10,468,797 B2
(45) Date of Patent: Nov. 5, 2019

(54) INSULATING BODY AND CONNECTOR WITH INSULATING BODY

(71) Applicant: LOTES CO., LTD, Keelung (TW)

(72) Inventors: Jia Xu Yin, Keelung (TW); Ted Ju, Keelung (TW)

(73) Assignee: LOTES CO., LTD, Keelung (TW)

( * ) Notice: Subject to any disclaimer, the term of this patent is extended or adjusted under 35 U.S.C. 154(b) by 0 days.

(21) Appl. No.: 15/848,239

(22) Filed: Dec. 20, 2017

(65) Prior Publication Data

US 2018/0183163 A1 Jun. 28, 2018

(30) Foreign Application Priority Data

Dec. 23, 2016 (CN) ...................... 2016 2 1424141 U

(51) Int. Cl.

| H01R 13/62 | (2006.01) |
|---|---|
| H01R 12/72 | (2011.01) |
| H01R 13/629 | (2006.01) |
| H01R 43/18 | (2006.01) |
| H01R 13/50 | (2006.01) |

(Continued)

(52) U.S. Cl.
CPC ....... *H01R 12/721* (2013.01); *B29C 45/0025* (2013.01); *B29C 45/14639* (2013.01); *H01R 13/50* (2013.01); *H01R 13/629* (2013.01); *H01R 13/62933* (2013.01); *H01R 43/18* (2013.01); *H01R 12/72* (2013.01)

(58) Field of Classification Search
CPC ...... H01R 12/721; H01R 12/72; H01R 13/50; H01R 13/629; H01R 13/62933; H01R 43/18; B29C 45/0025; B29C 45/14639; B29C 2045/0027; B29C 2045/0032
USPC .................................................. 439/325–328
See application file for complete search history.

(56) References Cited

U.S. PATENT DOCUMENTS

| 4,399,093 A * | 8/1983 | Kirby ...................... B29C 45/00 264/328.12 |
|---|---|---|
| 5,225,136 A * | 7/1993 | Furugohri ........... B29C 45/0025 264/328.12 |

(Continued)

FOREIGN PATENT DOCUMENTS

| CN | 204289820 U | 4/2015 |
|---|---|---|
| CN | 204289852 U | 4/2015 |

(Continued)

*Primary Examiner* — Khiem M Nguyen
(74) *Attorney, Agent, or Firm* — Locke Lord LLP; Tim Tingkang Xia, Esq.

(57) ABSTRACT

An insulating body and a connector with the insulating body are provided. A first gate and a second gate with different areas are disposed in one end of the insulating body. Further, an insulating body of a connector is provided. The insulating body is symmetrically disposed about a center line thereof, and a first gate and a second gate located on two opposite sides of the center line are asymmetrically disposed in one end of the insulating body. By providing the first and second gates with different areas, the areas of the two injection gates that allow molten plastic to enter a cavity in the mold for molding the insulating body will be changed. Alternatively, by providing the first and second gates asymmetrically about the center line, the lengths of the flow channel paths from the two injection gates to each part of the insulating body are different.

9 Claims, 10 Drawing Sheets

(51) Int. Cl.
*B29C 45/14* (2006.01)
*B29C 45/00* (2006.01)

(56) References Cited

U.S. PATENT DOCUMENTS 6,561,782 B1 * 5/2003 Umemoto ......... B29C 45/14655
 264/272.17
8,632,716 B2 1/2014 Fukushima

FOREIGN PATENT DOCUMENTS

CN 204481201 U 7/2015
CN 205112277 U 3/2016

* cited by examiner

INSULATING BODY AND CONNECTOR WITH INSULATING BODY

CROSS-REFERENCE TO RELATED PATENT APPLICATION

This non-provisional application claims priority to and the benefit of, pursuant to 35 U.S.C. § 119(a), patent application Ser. No. CN201621424141.7 filed in China on Dec. 23, 2016. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to an injection molded insulating body, and more particularly to a connector changing weld marks on the insulating body.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In the prior art, most insulating members are produced through injection molding. In order to make a molten resin material fill a cavity for molding an insulating member in a mold in a shorter time, multiple injection gates for plastic filling (usually two injection gates for plastic filling) are adopted, two material flows can be formed through the two injection gates for plastic filling, a weld mark may be generated when the two material flows converge, and the position of the weld mark has the defect of low structural strength. However, based on the stress condition of the insulating member and production and processing needs, it is necessary to adjust the position of the weld mark and to eliminate or reduce the influence of the weld mark.

In a conventional method, the mold is heated so that mold temperature at the time of filling is higher than the glass transition temperature and the thermal deformation temperature of a non-crystalline resin and also higher than the melting temperature of a crystalline resin, in this way, resins converge in a higher-temperature molten state, and resins are solidifying while being sufficiently pressed into the mold, thereby completely eliminating the weld mark or reducing the groove depth of the weld mark so as to reduce the influence of the weld mark. However, the method requires the design of a complex heating device in the mold, making the mold structure complicated, cost increased, and the overall volume of the mold larger.

For another example, a conventional slot connector has a dense array of terminals, and the corresponding structure of an insulating body is complex, resulting in many weak places on the insulating body; the structure of the insulating body has a lot of material flows during the injection molding process of the insulating body, resulting in converging of multiple melt material flows to produce weld marks; the slot connector may be subjected to external force during insertion of an electronic card and assembly of the terminals, so the weak places on the insulating body are prone to breakage, and people in the industry often add ribs or grooves to the insulating body to adjust the positions of the weld marks; however, due to the limitation of the product structure itself, the ribs or grooves cannot be added freely or easily.

Therefore, a heretofore unaddressed need to design a new insulating body and a connector with the insulating body exists in the art to address the aforementioned deficiencies and inadequacies.

SUMMARY

The objective of the invention is directed to an insulating body and a connector with the insulating body, so as to change the positions of weld marks formed on the insulating body.

To achieve the foregoing objective, the present invention adopts the following technical solution:

An insulating body includes a first gate and a second gate, being disposed at a same end of the insulating body, where an area of the first gate is larger than an area of the second gate.

In certain embodiments, the area of the first gate is at least twice as large as the area of the second gate.

In certain embodiments, the insulating body defines a transverse direction, the first gate and the second gate are disposed on the insulating body at an interval in the transverse direction, and the insulating body has a weld mark disposed closer to the second gate in the transverse direction.

In certain embodiments, the insulating body is provided with a mounting portion having a first end wall, a second end wall opposite to the first end wall, and two first side walls connected to the first end wall and the second end wall, the first gate and the second gate are disposed in the first end wall, and the weld mark is formed on the second end wall.

In certain embodiments, the insulating body is provided with an insertion slot extending in a lengthwise direction for insertion of an electronic element, and the lengthwise direction is perpendicular to the transverse direction; the mounting portion is located at one end of the insertion slot; the second end wall is provided with a guide groove communicating with the insertion slot in the lengthwise direction for guiding the electronic element; and the weld mark is formed in a region outside the guiding groove in the transverse direction.

In certain embodiments, the insulating body further includes an overflow port disposed in another end of the insulating body, and the overflow port is disposed closer to the second gate in the transverse direction.

In certain embodiments, the insulating body has a center line, and a center of the first gate and a center of the second gate are symmetrically disposed about the center line.

A connector includes an insulating body, having a first end wall, where the first end wall is provided with a first gate and a second gate, and an area of the first gate is larger than an area of the second gate; and at least one terminal, disposed on the insulating body.

In certain embodiments, the area of the first gate is at least twice as large as the area of the second gate.

In certain embodiments, the insulating body is provided an insertion slot extending in a lengthwise direction for insertion of an electronic element, the insulating body defines a transverse direction perpendicular to the lengthwise direction, and the first gate and the second gate are disposed at one end of the insertion slot at an interval in the transverse direction.

In certain embodiments, the insulating body is provided with at least one mounting portion, and each of the at least one mounting portion has a guide groove communicating with the insertion slot in the lengthwise direction for guiding the electronic element, the first end wall, and a weld mark disposed closer to the second gate in the transverse direction.

In certain embodiments, the at least one mounting portion further has a second end wall and two first side walls disposed opposite to each other, an accommodating groove is defined by the first end wall, the second end wall and the two first side walls, and the weld mark is formed on the second end wall and disposed closer to the second gate in the transverse direction.

In certain embodiments, the second end wall is provided with two side walls projecting into the accommodating groove and a stop wall connected to the two side walls, the guide groove is defined by the two side walls and the stop wall, and the stop wall and the two side walls are disposed above the insertion slot; and the stop wall and the two side walls respectively have a height drop with the insertion slot in a vertical direction, and the weld mark is formed in a region outside the stop wall and the two side walls.

In certain embodiments, the connector further includes an ejector accommodated in the accommodating groove, and the ejector is configured to rotate relative to the insulating body so as to lock and release the electronic element.

In certain embodiments, the insulating body has a center line, and a center of the first gate and a center of the second gate are symmetrically disposed about the center line.

In certain embodiments, the insulating body is provided with two first end walls disposed opposite to each other, the first gate and the second gate are disposed on one of the two first end walls, the other of the two first end walls is provided with an overflow port, and the overflow port is disposed closer to the second gate in the transverse direction.

A connector includes: an insulating body, having an insertion slot extending in a lengthwise direction for insertion of an electronic element, and two first end walls located at two ends of the insertion slot, the insulating body being symmetrically disposed about a center line thereof extending in the lengthwise direction, where one of the two first end walls is provided with a first gate and a second gate located on two opposite sides of the center line and arranged asymmetrically, and the insulating body has a weld mark located on one side of the center line; and a plurality of terminals, disposed on the insulating body and located on two opposite sides of the insertion slot.

In certain embodiments, an area of the first gate is equal to an area of the second gate.

In certain embodiments, the insulating body is provided with at least one mounting portion, each of the at least one mounting portion has one of the first end walls, a second end wall opposite to the one of the first end walls, and an accommodating groove formed between the one of the first end walls and the second end wall, the second end wall is provided with a guide groove communicating with the insertion slot in the lengthwise direction for guiding the electronic element, and the weld mark is formed on the second end wall.

In certain embodiments, in a transverse direction perpendicular to the lengthwise direction, a distance between a center of the first gate and the center line is greater than a distance between a center of the second gate and the center line, and the weld mark and the center of the second gate are located on the same side of the center line.

In certain embodiments, the second end wall is provided with two side walls projecting into the accommodating groove and a stop wall connected to the two side walls, the guide groove is defined by the two side walls and the stop wall, and the stop wall and the two side walls are disposed above the insertion slot; and the stop wall and the two side walls respectively have a drop height with the insertion slot in the vertical direction, and the weld mark is formed in a region outside the stop wall and the two side walls.

Compared with the related art, the first gate and the second gate are disposed in one end of the insulating body, and the area of the first gate is larger than the area of the second gate. In this case, by changing the areas of the two injection gates, molten plastic is allowed to enter a cavity in the mold for molding the insulating body, and the volumes of molten plastic entering the two injection gates per time unit are different, thus changing the position of the weld mark. Alternatively, the insulating body is symmetrically disposed about the center line thereof, the first gate and the second gate are disposed in one end of the insulating body, the first gate and the second gate are located on two opposite sides of the center line and are disposed asymmetrically, and the weld mark is located on one side of the center line. In this case, the lengths of the flow channel paths from the two injection gates to each part of the insulating body are different, so that the weld marks are formed away from locations of the insulating body that are greatly stressed or less structurally strong.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1:
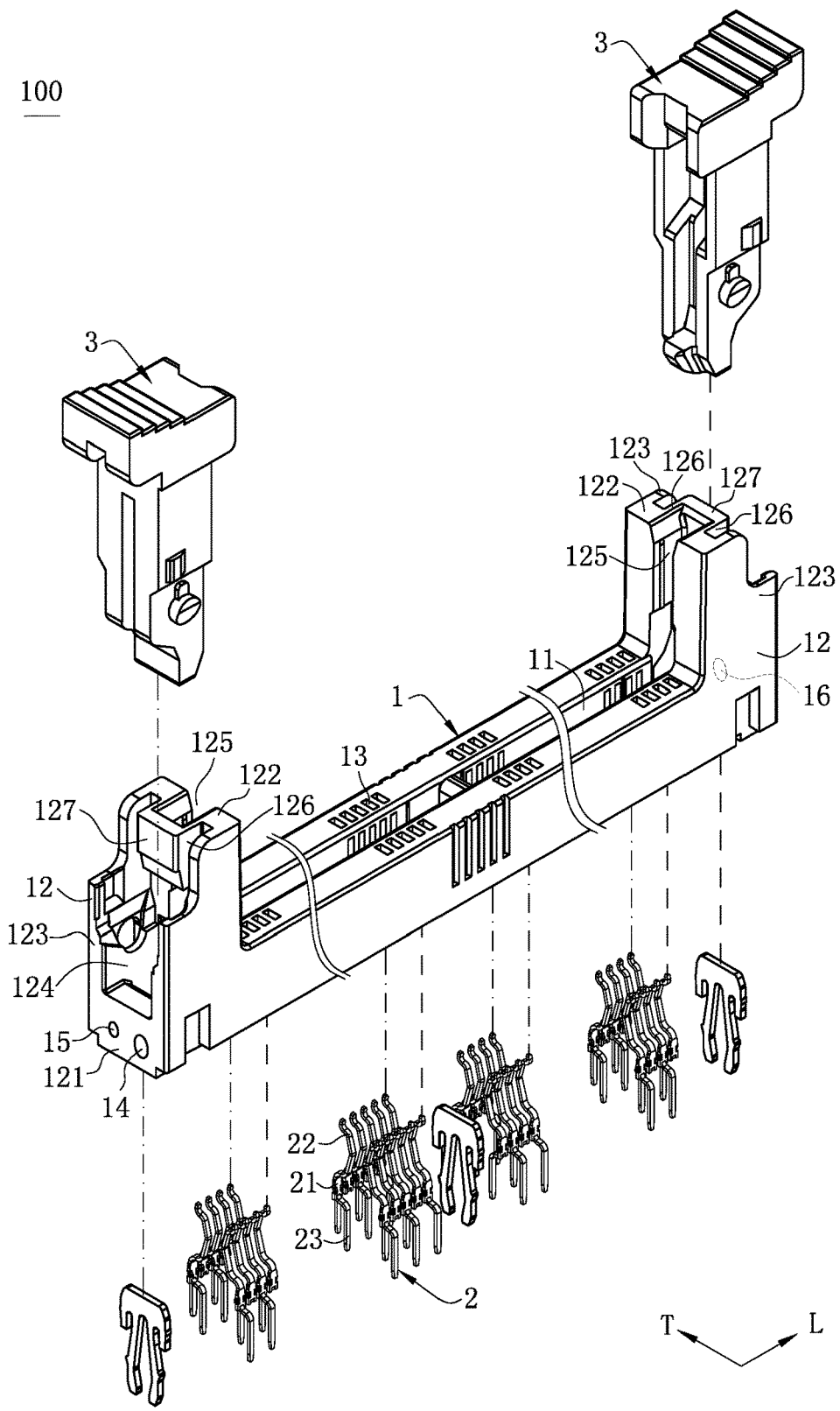
FIG. 1 is a perspective exploded view of a connector according to a first embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1-10. In accordance with the purposes of this invention, as embodied and broadly described herein, this invention, in one aspect, relates to an insulating body and a connector with the insulating body.

Please refer to FIG. 1 to FIG. 6, which show a connector 100 according to a first embodiment of the present invention, including an insulating body 1, a plurality of terminals 2 disposed on the insulating body 1, and two ejectors 3 pivoted to the insulating body 1. In this embodiment, the connector 100 is a card edge connector.

Figure 5:
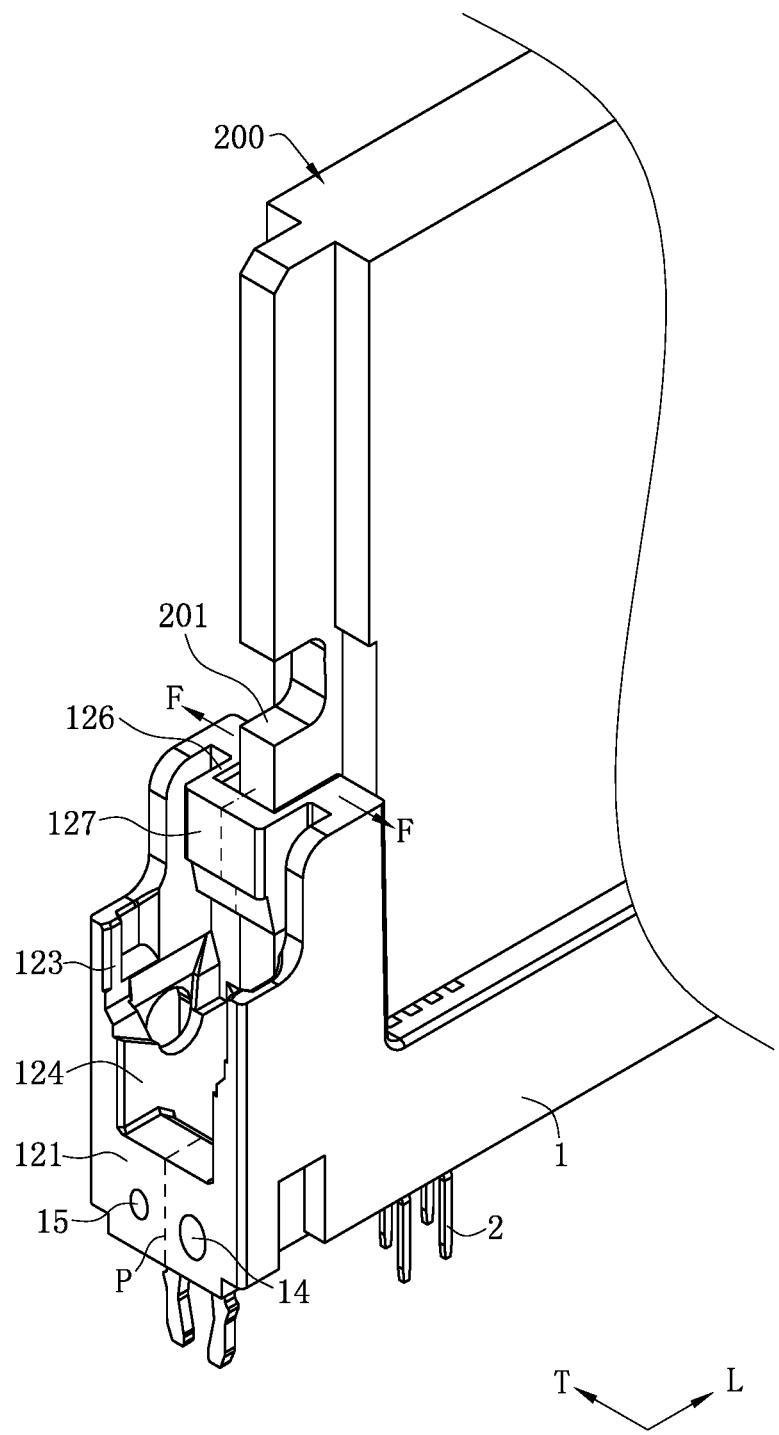
FIG. 5 is a local perspective view of an electronic element being inserted in the connector in FIG. 1.

Please refer to FIG. 1 and FIG. 5. The insulating body 1 defines a lengthwise direction L and a transverse direction T perpendicular to each other. The insulating body 1 has an insertion slot 11 extending in the lengthwise direction L, and the insertion slot 11 is used for insertion of an electronic element 200. In the embodiment, the electronic element 200 is an electronic card. The insulating body 1 has two mounting portions 12 at two ends of the insertion slot 11. Each mounting portion 12 is provided with a first end wall 121 and a second end wall 122 opposite to each other. The first end wall 121 and the second end wall 122 are disposed in the lengthwise direction L at an interval, and the second end wall 122 is disposed closer to the insertion slot 11 than the first end wall 121. Each mounting portion 12 is further provided with two first side walls 123. The two first side walls 123 are opposite to each other in the transverse direction T at an interval, and each first side wall 123 extends in the lengthwise direction L and is connected with the corresponding first end wall 121 and the corresponding second end wall 122. An accommodating groove 124 is defined by the first end wall 121, the second end wall 122 and the two first side walls 123. Each mounting portion 12 has a guide groove 125, and the guide groove 125 communicates with the insertion slot 11 in the lengthwise direction L. Each second end wall 122 is provided with two side walls 126 projecting into the corresponding accommodating groove 124 and a stop wall 127 connected to the two side walls 126. The guide groove 125 is defined by the two side walls 126 and the stop wall 127, and the two side walls 126 and the stop wall 127 are disposed above the insertion slot 11. The two side walls 126 and the stop wall 127 respectively have a height drop with the insertion slot 11 in the vertical direction. In other words, the two side walls 126 and the stop wall 127 are suspended above the accommodating groove 124, and the lower end of the accommodating groove 124 communicates with the insertion slot 11 in the lengthwise direction L. The insulating body 1 is provided with a plurality of terminal slots 13 arranged in a row in the lengthwise direction L at each of the two sides of the insertion slot 11. Each terminal slot 13 penetrates through the insulating body 1 vertically, and the terminal slots 13 communicate with the insertion slot 11 in the transverse direction T.

Please refer to FIG. 1 and FIG. 5. The terminals 2 are correspondingly accommodated in the terminal slots 13. Each terminal 2 is provided with a fixing portion 21, a contact portion 22 extending upward from the fixing portion 21, and a soldering portion 23 extending downward from the fixing portion 21. The fixing portion 21 is retained in the terminal slot 13. The contact portion 22 at least partially projects into the insertion slot 11 to be electrically connected to the electronic element 200. The soldering portion 23 projects downward out of the bottom of the insulating body 1 to be connected to a circuit board.

Please refer to FIG. 1 and FIG. 5. Each ejector 3 is accommodated in the corresponding accommodating groove 124, and is pivoted to the corresponding mounting portion 12, so that each ejector 3 is configured to rotate in the lengthwise direction L relative to the insulating body 1 so as to lock and release the electronic element 200.

Please refer to FIG. 1 and FIG. 5. The electronic element 200 is provided with two opposite side edges 201. Each side edge 201 is used to be accommodated in the guide grooves 125. When the electronic element 200 is inserted into the insertion slot 11 from top to bottom, the side edges 201 apply outward action forces F in the transverse direction T to the two side walls 126 opposite to each other. Thus, the symmetrical center position of each stop wall 127 in the transverse direction T is the location where the largest force is the applied.

Figure 2:
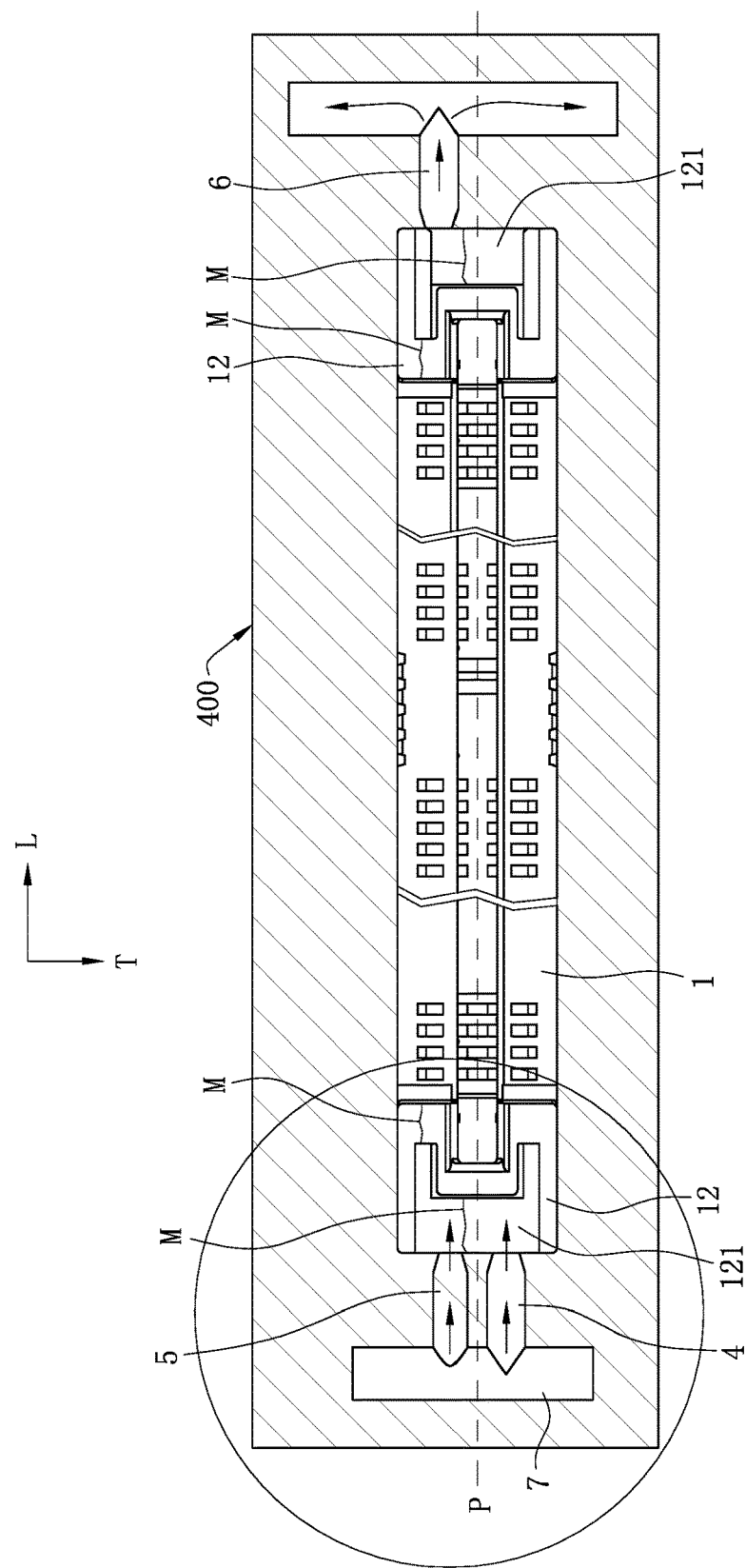
FIG. 2 is a schematic view of an insulating body and a mold for molding the insulating body according to the first embodiment of the present invention.
Figure 3:
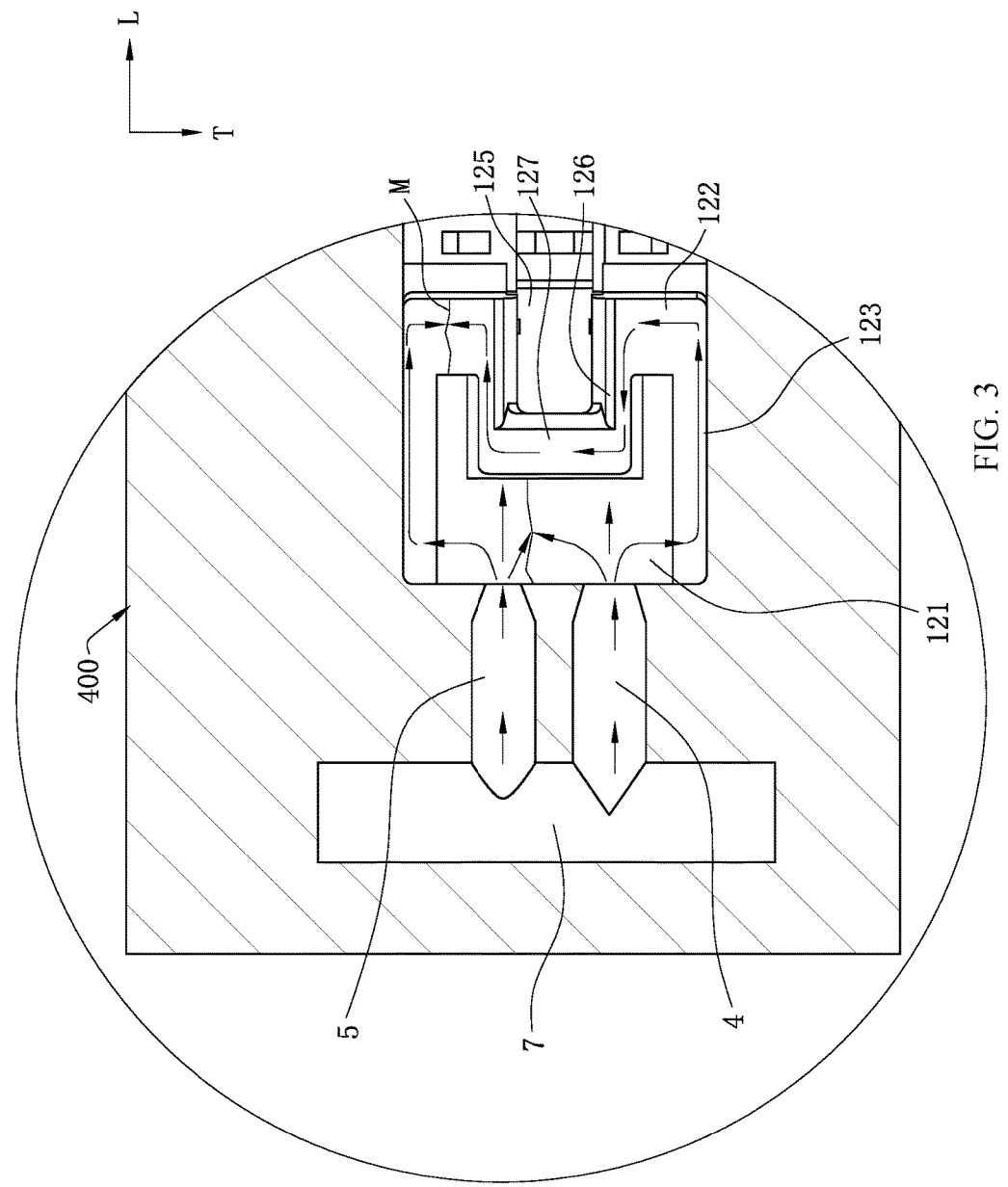
FIG. 3 is a partially enlarged view of FIG. 2.
Figure 4:
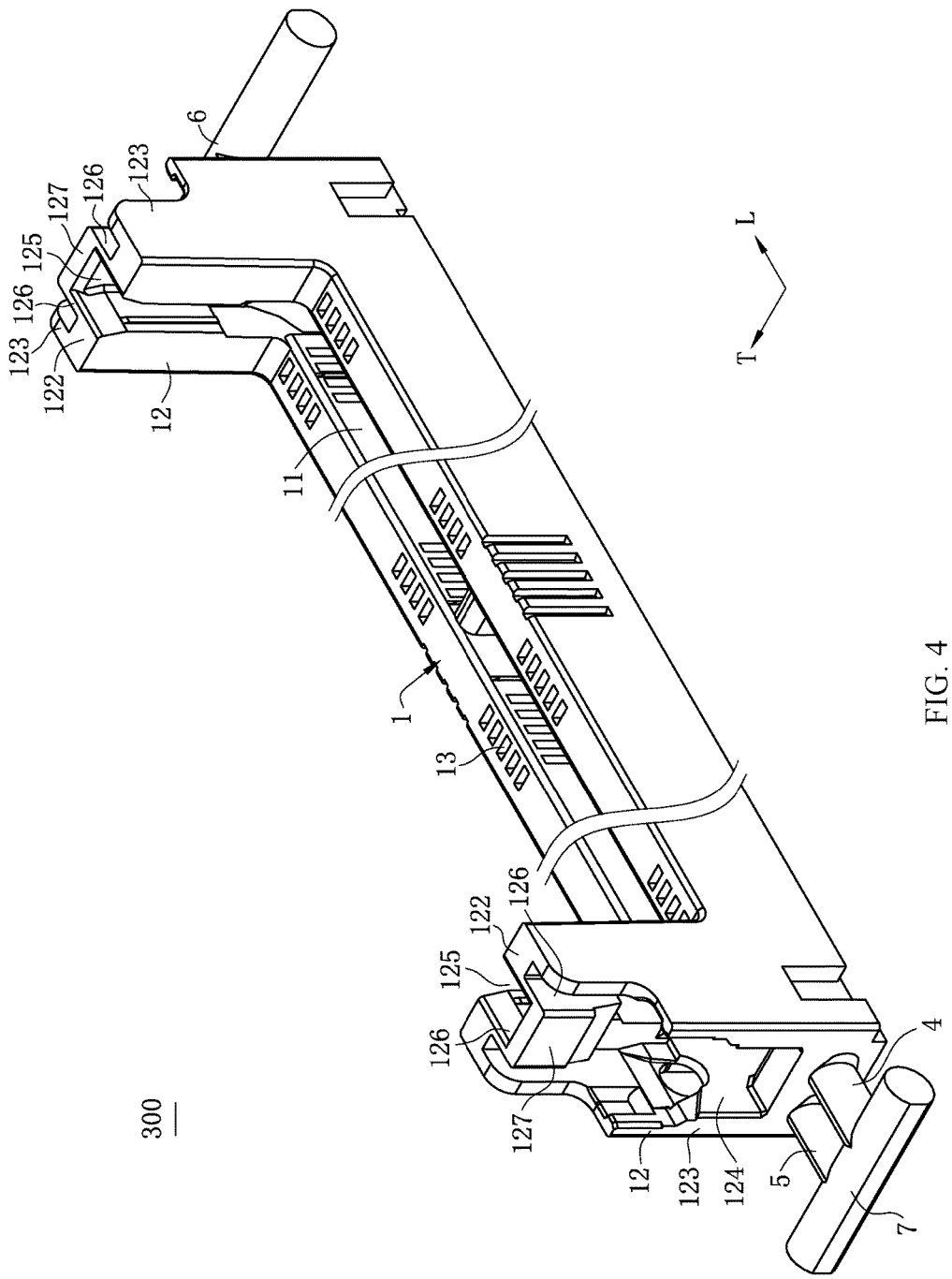
FIG. 4 is a perspective view of the insulating body according to the first embodiment of the present invention.

Please refer to FIG. 2, FIG. 4 and FIG. 5. Multiple molded members 300 are formed through injection molding by means of a mold 400 with a plurality of cavities. Each molded member 300 includes the insulating body 1 as well as a first gate member 4, a second gate member 5 and an overflow member 6 which are respectively connected to the insulating body 1. By breaking the first gate member 4, the second gate member 5 and the overflow member 6 which are connected to the insulating body 1 in the molded member 300, a finished molded member, that is, the insulating body 1 can be formed. The first gate member 4 and the second gate member 5 are connected to the first end wall 121 at a same end of the insulating body 1. The overflow member 6 is connected to the first end wall 121 at the other end of the insulating body 1. The first gate member 4 and the second gate member 5 are connected to a same main gate member 7. The first gate member 4, the second gate member 5 and the main gate member 7 are all formed by cooled molten plastic in a gate flow channel connected to a cavity in the mold 400 for molding the insulating body 1. A cross section of the location where the first gate member 4 and the corresponding first end wall 121 are connected is defined as a first gate 14, and a cross section of the location where the second gate member 5 and the corresponding first end wall 121 are connected is defined as a second gate 15. A center of the first gate 14 and a center of the second gate 15 are located at an equal height. That is, a distance from the center of the first gate 14 to the bottom of the insulating body 1 is equal to a distance from the center of the second gate 15 to the bottom of the insulating body 1. An area of the first gate 14 is larger than an area of the second gate 15, and the area of the first gate 14 is at least twice as large as the area of the second gate 15. In the embodiment, the area of the first gate 14 is more than twice as large as the area of the second gate 15, and the shapes of the first gate 14 and the second gate 15 are oval. The overflow member 6 is formed by cooled molten plastic first entering the cavity for molding the insulating body 1 and then flowing out into an overflow well (not shown). A cross section of the location where the overflow member 6 is connected to the corresponding first end wall 121 is defined as an overflow port 16, and the overflow port 16 is disposed closer to the second gate 15 in the transverse direction T. The insulating body 1 has a center line P extending in the lengthwise direction L. The insulating body 1 is symmetrical about the center line P, and the center of the first gate 14 and the center of the second gate 15 are symmetrically disposed about the center line P. In other embodiments, the first gate 14 and the second gate 15 may be circular or in other shapes.

Figure 6:
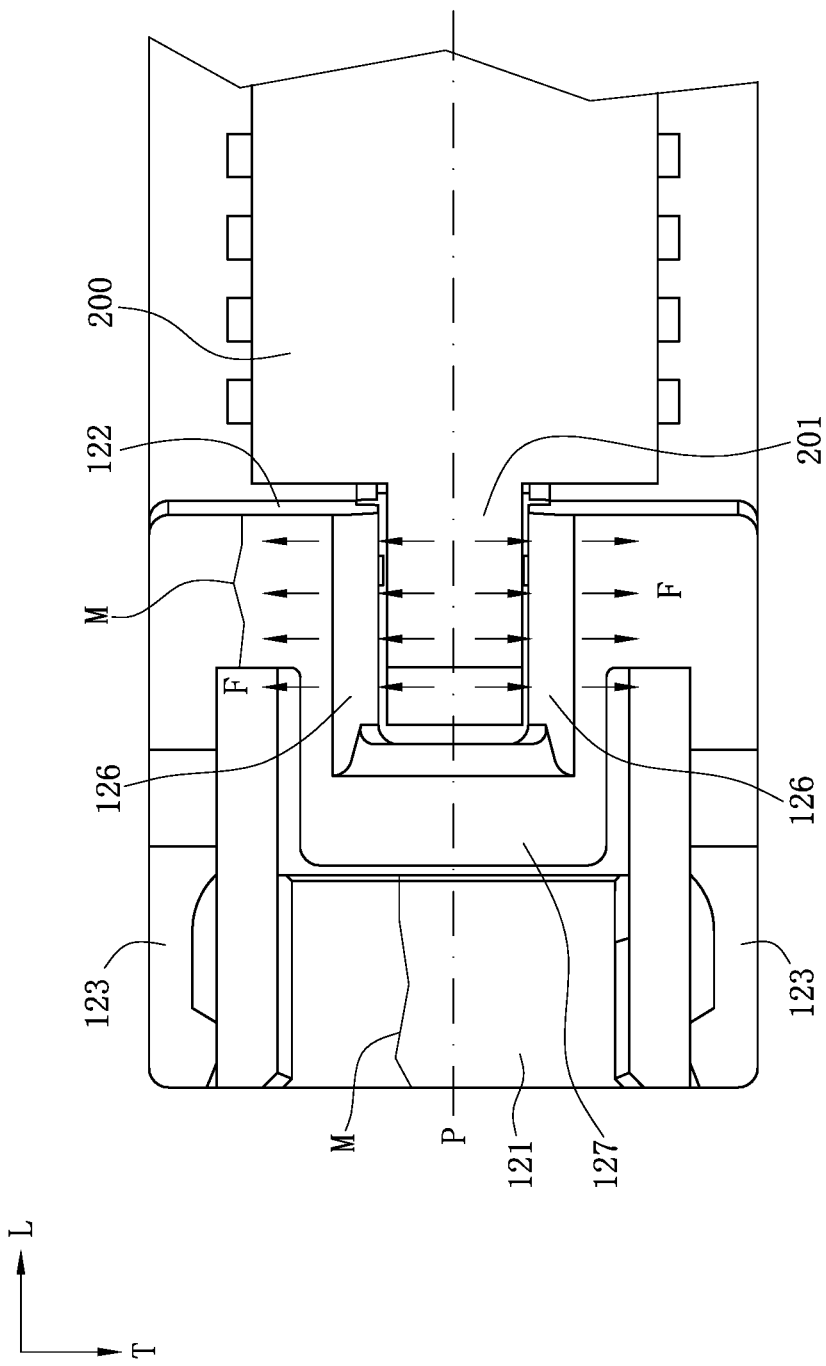
FIG. 6 is a top view of FIG. 5.

Please refer to FIG. 2, FIG. 4 and FIG. 6. Since the mounting portion 12 to which the first gate 14 and the second gate 15 are generally connected is heated at a higher temperature than the other mounting portion 12 at the other end, the plastic material of the mounting portion 12 formed at the end provided with the first gate 14 and the second gate 15 is more brittle than the plastic material of the mounting portion 12 at the other end. Accordingly, the structural strength of the mounting portion 12 formed at the end provided with the first gate 14 and the second gate 15 is weaker than the structural strength of the mounting portion 12 at the other end. Further, the mounting portion 12 formed at the end provided with the first gate 14 and the second gate 15 is more susceptible to damage by the action force F of the electronic element 200 than the mounting portion 12 at the other end.

Please refer to FIG. 2, FIG. 5 and FIG. 6. The cavity for molding the insulating body 1 is filled with molten plastic through the two injection gates of the mold 400, and many structures on the insulating body 1 can be formed by converging of two molten plastic flows. In this way, a weld mark M may be formed where the two molten plastic flows meet each other, and the strength of the insulating body 1 at the weld mark M is relatively weak. In the embodiment, a plurality of weld marks M may be formed on the mounting portion 12. For example, the weld marks M are formed on both the first end wall 121 and the second end wall 122. In comparison, in the related art, two identical injection gates are adopted and symmetrically disposed on the first end wall 121, and the weld mark may be substantially formed at the symmetric center of the stop wall 127 in the transverse direction T. Thus, the stop wall 127 may be easily broken at the weld mark M due to the relatively large force applied thereto. In the embodiment, since the area of the first gate 14 is larger than the area of the second gate 15, the weld marks M are located closer to the second gate 15 on the mounting portion 12 in the transverse direction T. That is, the weld mark M formed on the second end wall 122 is closer to the second gate 15 in the transverse direction T. Further, the weld mark M on the second end wall 122 is formed in a region outside the guide groove 125. That is, the weld mark M on the second end wall 122 is formed in a region outside the stop wall 127 and the two side walls 126. In this case, the weld mark M can be formed so as to avoid the two side walls 126 and the stop wall 127 which are suspended and weak in strength. Since the weld mark M is formed on the second end wall 122 and away from an intermediate positional region of the stop wall 127, when the side edge 201 is inserted into the guide groove 125, the strength of the insulating body 1 at the stop wall 127 can be increased to a certain extent, so as to reduce the probability of breakage of the stop wall 127.

Please refer to FIG. 2 and FIG. 6. On the first end wall 121 at the other end of the insulating body 1, the overflow port 16 is disposed closer to the second gate 15 in the transverse direction T, so that the weld mark M formed on the first end wall 121 at the other end is formed in the overflow well of the mold 400 by filling of the molten plastic. In this way, no weld mark M is left on the first end wall 121 at the other end of the insulating body 1, and therefore the strength of the first end wall 121 at the other end of the insulating body 1 may be increased accordingly. Alternatively, a weld mark M may be left on the first end wall 121 at the other end of the insulating body 1, and similarly, the weld mark M is also disposed closer to the second gate 15 in the transverse direction T.

FIG. 7 to FIG. 10 show a second embodiment of the present invention. The connector 100 in this embodiment has substantially same structure as the first embodiment, and the insulating body 1 is also symmetrically disposed about the center line P. The stop wall 127 and the two side walls 126 are disposed above the insertion slot 11, and the stop wall 127 and the two side walls 126 respectively have a height drop with and the insertion slot 11 in the vertical direction.

Figure 7:
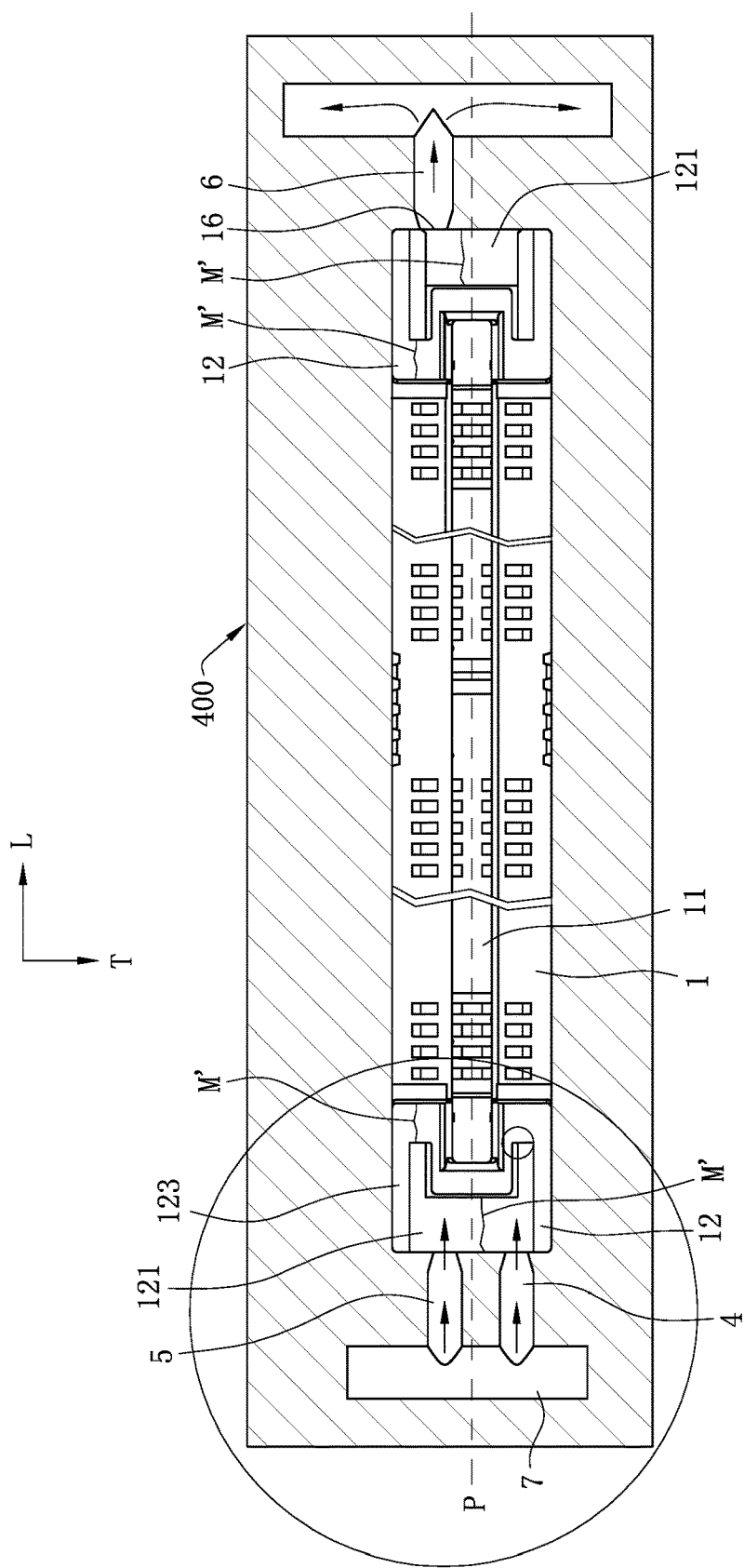
FIG. 7 is a schematic view of an insulating body and a mold for molding the insulating body according to a second embodiment of the present invention.
Figure 8:
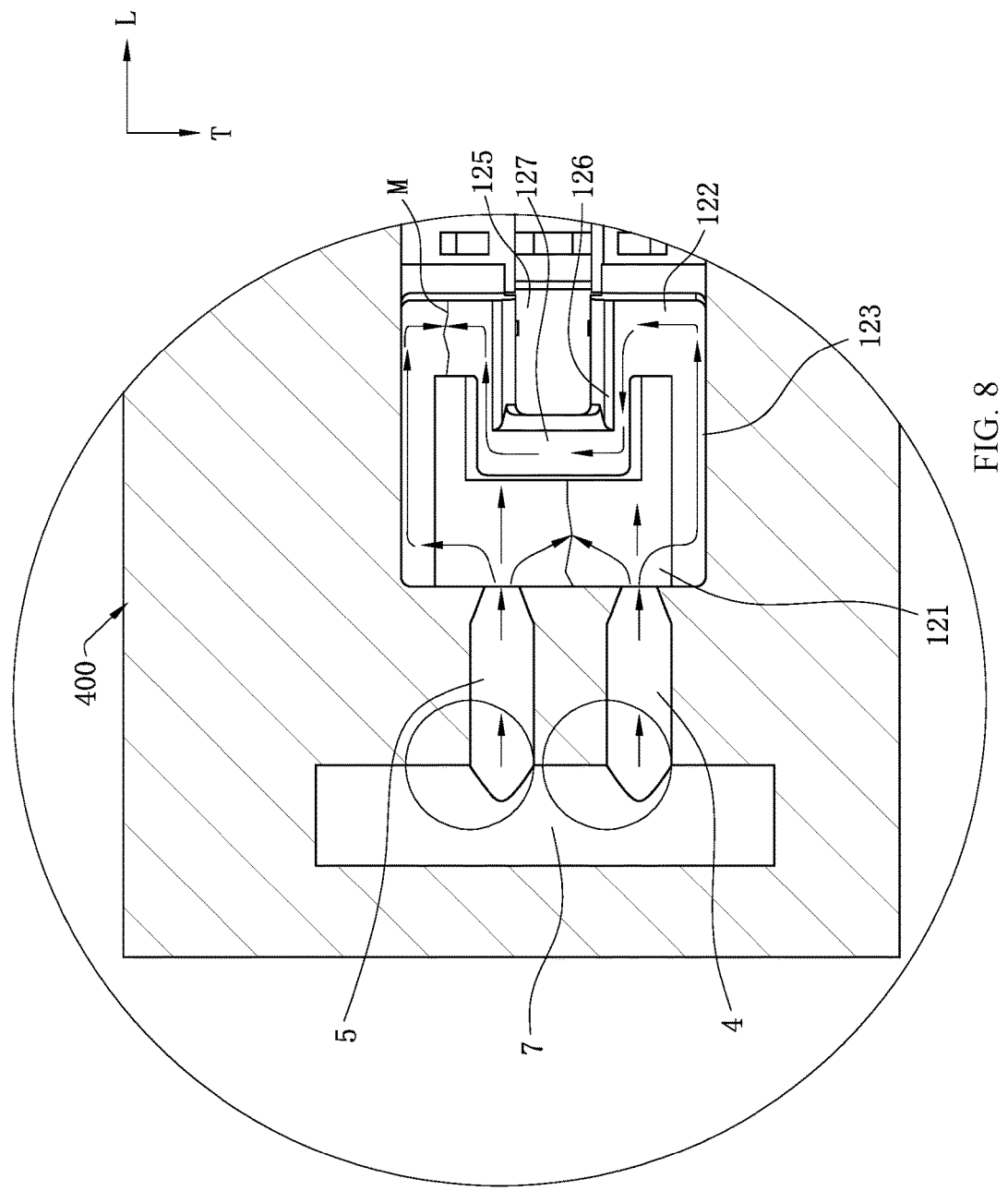
FIG. 8 is a partially enlarged view of FIG. 7.
Figure 9:
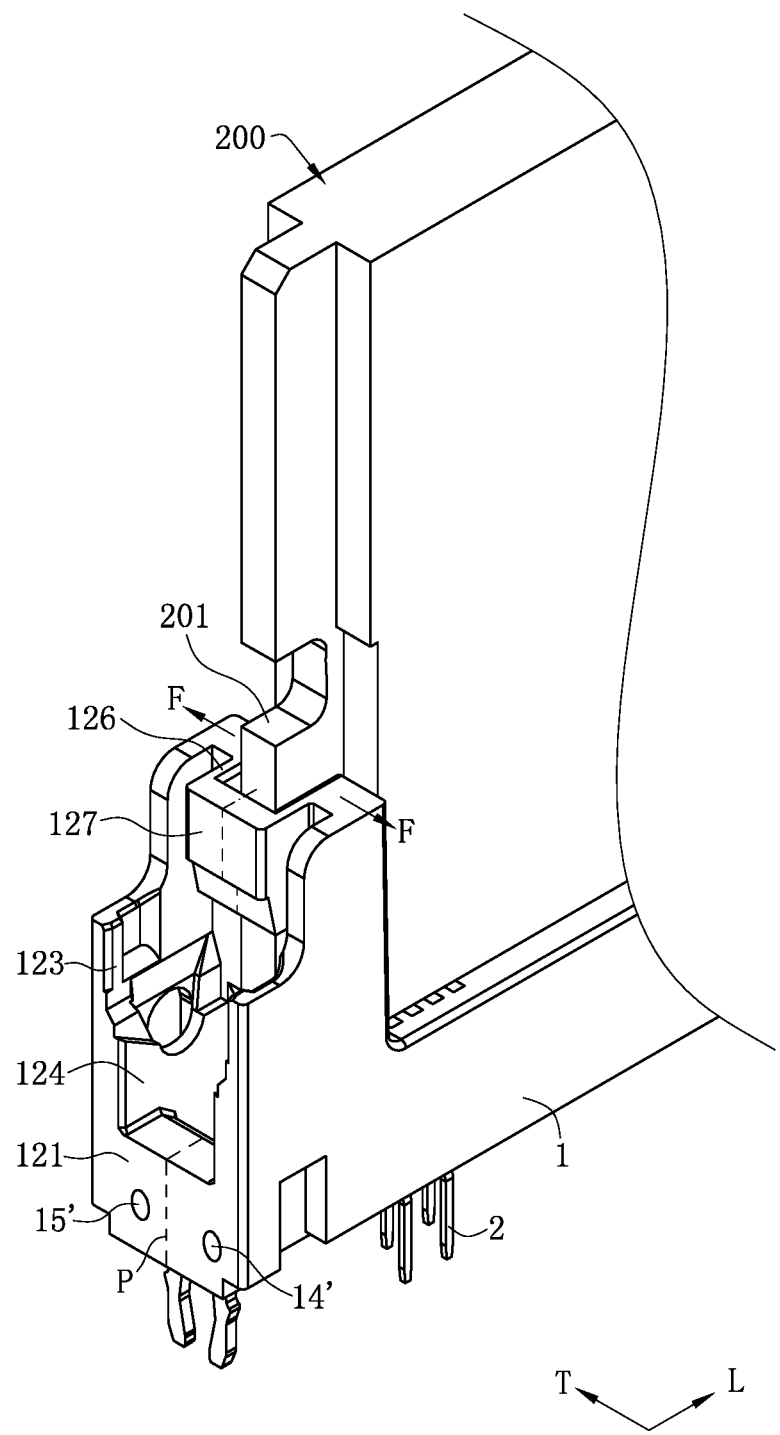
FIG. 9 is a local perspective view of an electronic element being inserted in the connector according to the second embodiment of the present invention.
Figure 10:
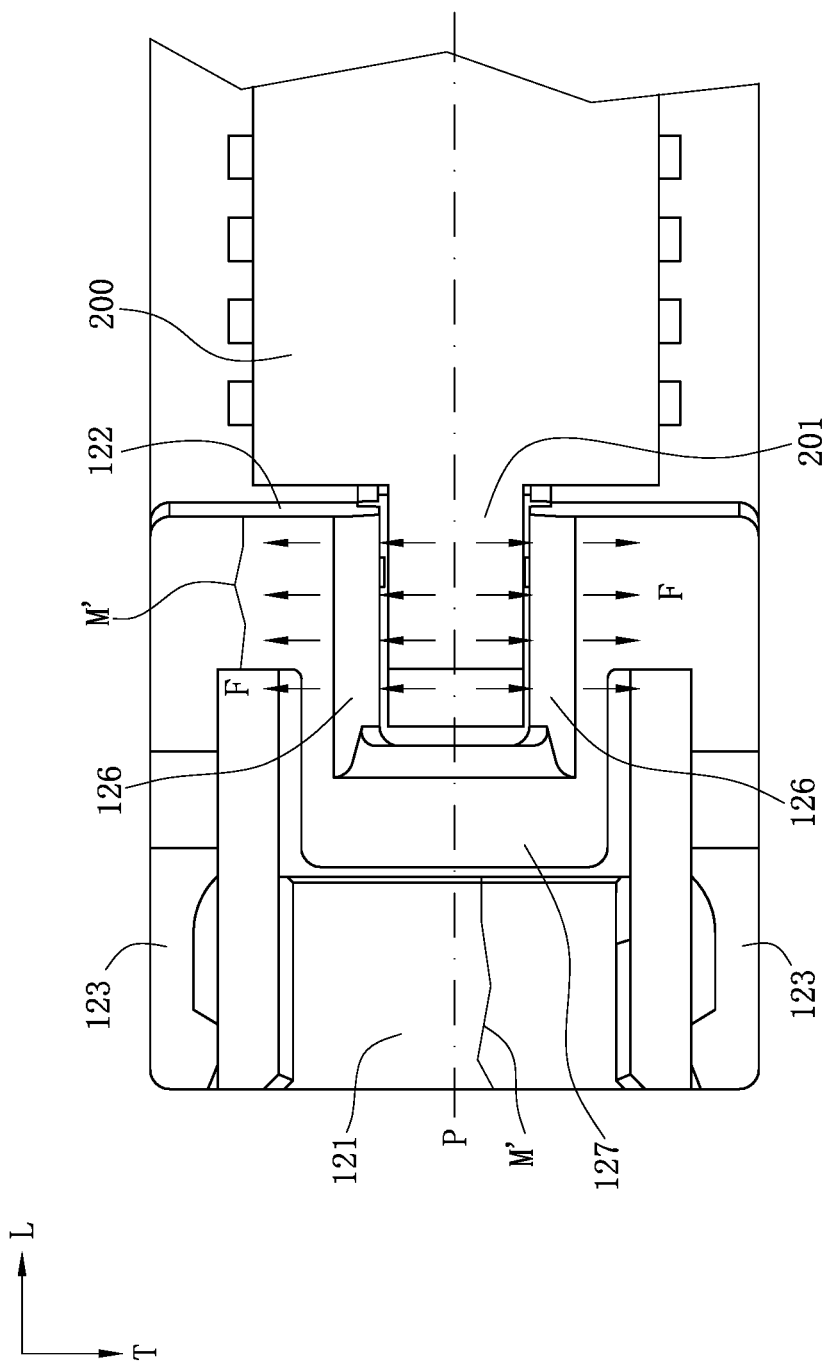
FIG. 10 is a top view of FIG. 9.

Please refer to FIG. 7 and FIG. 9. In the embodiment, a first gate 14' and a second gate 15' are disposed in one of the first end walls 121 of the insulating body 1, and a center of the first gate 14' and a center of the second gate 15' are disposed at an equal height. The area of the first gate 14' is equal to the area of the second gate 15'. The first gate 14' and the second gate 15' are of the same shape, which is oval, and alternatively can be in other shapes, such as circular. The center of the first gate 14' and the center of the second gate 15' are asymmetrically disposed about the center line P, and a distance between the center of the first gate 14' and the center line P in the transverse direction T is greater than a distance between the center of the second gate 15' and the center line P in the transverse direction T.

Please refer to FIG. 7 and FIG. 9. After molten plastic is filled from the two injection gates of the mold 400 and is cooled, the weld marks M' are formed on both the first end wall 121 and the second end wall 122. Since the distance between the center of the first gate 14' and the center line P in the transverse direction T is greater than the distance between the center of the second gate 15' and the center line P in the transverse direction T, the weld mark M on the second end wall 122 and the center of the second gate 15' are located on the same side of the center line P, the weld mark M' on the first end wall 121 provided with the first gate 14' and the center of the first gate 14' are located on the same side of the center line P, and the weld mark M' on the first end wall 121 provided with the overflow port 16 and the center of the second gate 15' are located on the same side of the center line P. Of course, in the embodiment, no weld mark M' may be left on the first end wall 121 at the other end of the insulating body 1. In the embodiment, the symmetric center of the stop wall 127 in the transverse direction T is also the location with the largest stress. Through the asymmetrical arrangement of the first gate 14' and the second gate 15' about the center line P, the lengths of the flow channel paths from the two injection gates to each part of the insulating body 1 are different, so that the weld marks M' are formed away from the locations of the insulating body 1 that are greatly stressed or less structurally strong. In addition, since the first gate 14' and the second gate 15' have the same shape and the same area, in design of the mold 400, the flow channels for molding the first gate member 4 and the flow channels for molding the second gate member 5 may be the same in design, which can avoid multiple calculations caused by different flow channel structures.

To sum up, the insulating body and the connector with the insulating body according to certain embodiments of the present invention have the following beneficial effects:

1. The first gate 14 and the second gate 15 are disposed in one end of the insulating body 1, and the area of the first gate 14 is larger than the area of the second gate 15. In this case, by changing the areas of the two injection gates, molten plastic is allowed to enter the cavity in the mold 400 for molding the insulating body 1, and the volumes of molten plastic entering the two injection gates per time unit are different, thus changing the positions of the weld marks M. Alternatively, the insulating body 1 is symmetrically disposed about the center line P thereof, the first gate 14' and the second gate 15' are disposed in one end of the insulating body 1, the first gate 14' and the second gate 15' are located on two opposite sides of the center line P and are disposed asymmetrically, and the weld marks M' are located on one side of the center line P. In this case, the lengths of the flow channel paths from the two injection gates to each part of the insulating body 1 are different, so that the weld marks M' are formed away from locations of the insulating body 1 that are greatly stressed or less structurally strong.

2. Since the injection gate for forming the second gate 15 in the mold 400 is small, the second gate 15 can become larger under wear due to factors such as the flow of molten plastic during injection molding. However, the area of the first gate 14 is at least twice as large as the area of the second gate 15. In other words, there is a large difference between the sizes of the first gate 14 and the second gate 15. In this way, the service life of the mold 400 is prolonged, and it is ensured that the weld marks M are formed away from the locations of the insulating body 1 that are greatly stressed or less structurally strong.

3. The stop wall 127 and the two side walls 126 respectively have a height drop with the insertion slot 11 in the vertical direction. In other words, the stop wall 127 and the two side walls 126 are suspended above the accommodating groove 124. The area of the first gate 14 is larger than the area of the second gate 15, or the first gate 14' and the second gate 15' are located on two opposite sides of the center line P and are disposed asymmetrically, so that the weld marks M/M' disposed on the second end wall 122 is formed in a region outside the stop wall 127 and the two side walls 126. In this case, the weld marks M/M' can be away from the locations that are greatly stressed or less structurally strong, such as the stop wall 127 and the two side walls 126.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An insulating body, comprising:
a first gate and a second gate, being disposed at a same end of the insulating body, wherein the insulating body defines a transverse direction, the first gate and the second gate are disposed on the insulating body at an interval in the transverse direction, and an area of the first gate is larger than an area of the second gate;
a weld mark disposed closer to the second gate in the transverse direction; and
a mounting portion having a first end wall, a second end wall opposite to the first end wall, and two first side walls connected to the first end wall and the second end wall, wherein the first gate and the second gate are disposed in the first end wall, and the weld mark is formed on the second end wall,
wherein the insulating body is provided with an insertion slot extending in a lengthwise direction for insertion of an electronic element, the lengthwise direction is perpendicular to the transverse direction, the mounting portion is located at one end of the insertion slot, the second end wall is provided with a guide groove communicating with the insertion slot in the lengthwise direction for guiding the electronic element, and the weld mark is formed in a region outside the guiding groove in the transverse direction.

2. The insulating body according to claim 1, wherein the area of the first gate is at least twice as large as the area of the second gate.

3. The insulating body according to claim 1, further comprising an overflow port disposed in another end of the insulating body, and the overflow port is disposed closer to the second gate in the transverse direction.

4. The insulating body according to claim 1, wherein the insulating body has a center line, and a center of the first gate and a center of the second gate are symmetrically disposed about the center line.

5. A connector, comprising:
an insulating body, having at least one mounting portion, each of the at least one mounting portion has a first end wall, wherein the insulating body is provided an insertion slot extending in a lengthwise direction for insertion of an electronic element, the insulating body defines a transverse direction perpendicular to the lengthwise direction, the first end wall is provided with a first gate and a second gate, the first gate and the second gate are disposed at one end of the insertion slot at an interval in the transverse direction, an area of the first gate is larger than an area of the second gate, and each of the at least one mounting portion has a guide groove communicating with the insertion slot in the lengthwise direction for guiding the electronic element; and
at least one terminal, disposed on the insulating body,
wherein the at least one mounting portion further has a second end wall and two first side walls disposed opposite to each other, an accommodating groove is defined by the first end wall, the second end wall and the two first side walls, a weld mark is formed on the second end wall and disposed closer to the second gate in the transverse direction, the second end wall is provided with two side walls projecting into the accommodating groove and a stop wall connected to the two side walls, the guide groove is defined by the two side walls and the stop wall, the stop wall and the two side walls are disposed above the insertion slot, the stop wall and the two side walls respectively have a height drop with the insertion slot in a vertical direction, and the weld mark is formed in a region outside the stop wall and the two side walls.

6. The connector according to claim 5, wherein the area of the first gate is at least twice as large as the area of the second gate.

7. The connector according to claim 5, further comprising an ejector accommodated in the accommodating groove, and the ejector is configured to rotate relative to the insulating body so as to lock and release the electronic element.

8. The connector according to claim 5, wherein the insulating body has a center line, and a center of the first gate and a center of the second gate are symmetrically disposed about the center line.

9. The connector according to claim 5, wherein the insulating body is provided with two first end walls disposed opposite to each other, the first gate and the second gate are disposed on one of the two first end walls, the other of the two first end walls is provided with an overflow port, and the overflow port is disposed closer to the second gate in the transverse direction.

* * * * *